Figure 1:
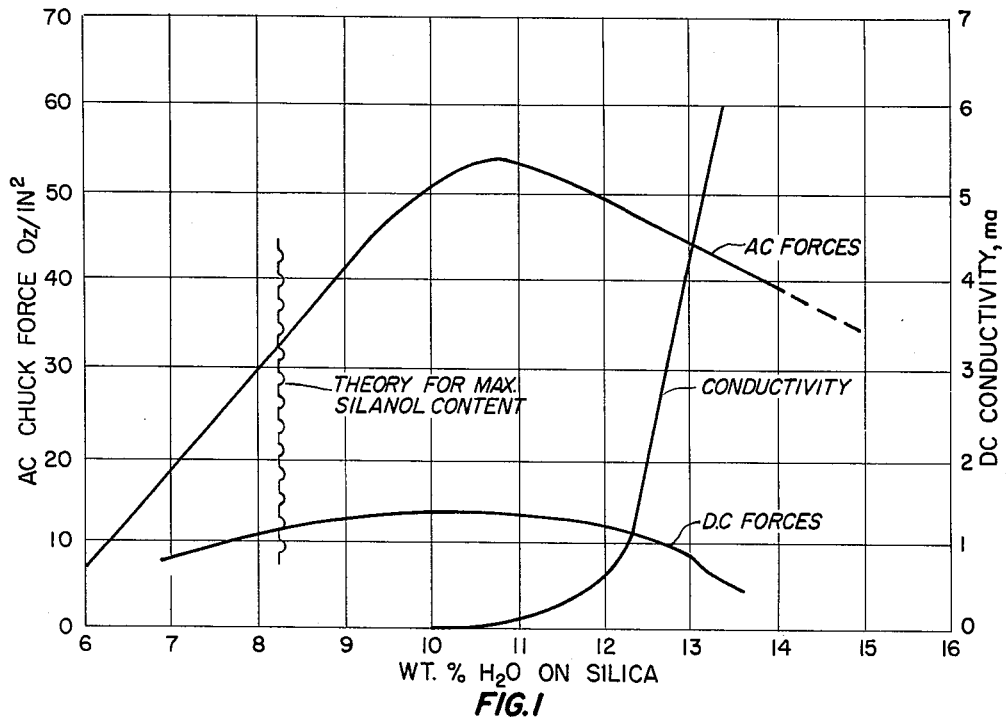

INVENTORS
THOMAS W. MARTINEK
BY DONALD L. KLASS

*Edward H. Lang*
ATTORNEY

United States Patent Office 3,250,726
Patented May 10, 1966

3,250,726
PREPARATION OF SILICA FOR USE IN ELECTRIC-FIELD-RESPONSIVE COMPOSITIONS
Thomas W. Martinek, Crystal Lake, and Donald L. Klass, Barrington, Ill., assignors, by mesne assignments, to Union Oil Company of California, Los Angeles, Calif., a corporation of California
Filed Mar. 29, 1962, Ser. No. 183,630
16 Claims. (Cl. 252—317)

This invention is directed to an improved silica-base electric-field-responsive composition. More particularly, this invention is directed to electri-field-responsive compositions which evidence greater change in bulk viscosity under the influence of an applied electric field than do prior art compositions. In a specific aspect, this invention is directed to a method for preparing silica especially adapted for use in electric-field-responsive compositions.

It is known that certain fluids respond to the influence of an electric potential by evidencing an apparent and pronounced increase in bulk viscosity. The phenomenon is reversible, and the compositions revert to their initial viscosity when the electric field is removed. Such fluids have been designated electrofluids, and are described in patents to Willis M. Winslow, 2,661,596, and 2,661,825. Such electrofluids are commonly used in electrofluid clutches, wherein the fluid is disposed between the surfaces of two electrically conductive members, and electric potential is imposed across the two members. The electrofluid responds to the application of an electric potential by instantaneously, but reversibly, changing in apparent bulk viscosity. In strong fields, the fluid thickens into a solid or semisolid condition, whereby torque can be transmitted between the surfaces of the clutch members.

It is further known that certain electrofluids, when exposed to an alternating electric field, exhibit a similar change in bulk viscosity, even though the fluid is not in contact with the potential-carrying electrodes. This phenomenon is used in electrofluid chucking devices, by means of which conductive objects can be secured with an electrofluid film. It is further known that by incorporating a suitable quantity of a finely divided, particulate, conductive material in the electrofluid used with an alternating-field chucking device, non-metallic, non-conductive objects can be secured with about the same efficiency with which non-conductive electrofluids can be used to secure conductive objects.

While the electrofluid phenomenon was disclosed in U.S. Patent 2,417,850, to Willis M. Winslow, which issued April 14, 1942, electrofluids have not been commercially utilized to an appreciable extent largely because of their relatively low holding power, and the instability of the electrofluids known to the prior art. Such fluids suffered from serious disadvantages in that the change in apparent viscosity on exposure to an electric field, while startlingly dramatic, was yet insufficient to securely couple the driving and driven elements of electrofluid clutches so that the torque transmitted could satisfy practical requirements. Moreover, the electrofluids of the prior art tended to deteriorate so that the forces which could be transmitted through the fluids gradually decreased to very low values. Also, phase separation of the fluids frequently occurred upon storage, rendering the fluids utterly useless. The rate of deterioration of prior art electrofluids is accelerated by storage or operation at temperatures only slightly in excess of ambient temperatures.

For example, the best electrofluids of the prior art were known to deteriorate to such an extent, upon storage for as short a period as a week at temperatures of about 150° F., as to render the fluids useless.

It is, therefore, a primary object in this invention to provide novel electrofluid compositions capable of displaying greater change in apparent bulk modulus upon exposure to an electric field, thereby greatly enhancing the force-transmitting characteristics of couplings or clutches with which the fluids may be employed. Another object of this invention is to provide electrofluids of outstanding initial electro-activity which can be stored for long periods of time without deterioration, phase separation, or reduction in electro-activity. Yet another object of this invention is to provide electrofluids of improved electro-activity which can be stored at temperatures as high as 250° F. for long periods of time without deterioration or loss of activity. Yet another object of this invention is to provide silica especially adapted for use in electrofluids. Still another object of this invention is to provide a method of producing silica having surfaces substantially saturated with silanol (silica-bonded hydroxyl) groups. A further object of this invention is to provide a method for reducing the free-water content of silanol silica without reducing substantially the silanol content thereof.

Electrofluids of the prior art comprise mixtures of fine particulate material, such as silica gel powders, an electrically stable oleaginous vehicle of high resistivity, an oil-soluble surfactant, water, and minor amounts of sundry other ingredients. For example, in U.S. Patent 2,661,596, Winslow discloses an electrofluid comprising 100 parts by weight of dry, micronized silica gel of desiccant grade, 40 parts by weight of an oleaginous vehicle, 15 parts by weight of sorbitol sesquioleate, 10 parts by weight of sodium oleate, and about 15 parts by weight of water.

It has now been found that the selection of silica gels employed in electrofluids is critical with respect to the electro-activity of the fluid, and that the incorporation of excess amounts of water or improperly adsorbed water in the electrofluid is deleterious to both the initial electro-activity of the fluid, and its storage stability.

It is known that silica may contain water in the form of hydroxyl groups linked to silicon atoms. It is further known that high-surface-area silica gels are capable of adsorbing or holding varying quantities of water which are not chemically bound to the silica. Thus, the water may be physically bound or adsorbed by the silica gel, which herein will be designated "free water" because it is not chemically bonded to the silica and exists in the form of normal water molecules, rather than as hydroxyl groups. It has been found that the presence of chemically bound water, as hydroxyl (silanol) groups linked to silicon atoms at the surface of the silica particles, is critical to the electro-activity of silica-based electrofluids. It has further been found that the presence of "free water" adsorbed by the silica gel is also critical to electroactivity, and to the storage stability of electrofluids.

For purposes of this specification, electrofluids are divided into two classes, viz., those fluids which display a substantial change in apparent bulk modulus upon exposure to a transient electric field, i.e., an alternating electric field, but do not display a substantial change in apparent bulk modulus upon exposure to a constant-potential electric field; and those electrofluids which are activated by, or display, a dramatic change in bulk modulus in the presence of an electric field of either constant or varying potential. In accordance with this invention, electrofluids of the first class, i.e., those displaying change in bulk modulus on exposure to transient electric fields only, are compounded of silica gels, the surface of which has not less than about six silica-bonded hydroxyl groups per square millimicron of surface area. Such fluids may contain free water in the amount of zero to about four molecules per square millimicron of silica surface area, preferably one to two molecules of free water per square millimicron of silica surface area. It is especially preferred that the silica gel contain about eight silica-bonded hydroxyl groups per square millimicron of silica surface area, which is believed to be the maximum number of silica-bonded hydroxyl groups obtainable.

Electrofluids of the second class, i.e., those displaying electro-activity in the presence of either varying or constant-potential electric fields, are compounded of silica gel containing not less than five silica-bonded hydroxyl groups per square millimicron of silica surface area. It is preferred that the silica contain the maximum number of silica-bonded hydroxyl groups, which is about eight groups per square millimicron of surface area. These electrofluids may contain zero to four molecules of free water per square millimicron of surface area, preferably one to two molecules of free water per square millimicron of surface area.

Electrofluids compounded in accordance with this invention, in addition to the silica, include a high-resistivity oleaginous vehicle having a dielectric constant not greater than ten, preferably in the range of about two to five, and preferably will contain a small amount of fluidizer sufficient to render the composition fluid or thixotropic. Where the electrofluid is to display electro-activity in the presence of both transient and constant potentials, the fluid must contain a basic nitrogen compound, in the range of about 0.1 to about 25% by volume. The actual amount required will be dependent upon the surface area and pore volume of the silica, and the molecular weight and density of the basic compound. The presence of such a compound is critical to electro-activity in the presence of a field of constant potential. It will be evident to those skilled in the art that the basic nitrogen compound and the fluidizer may be, in fact, a single additive which provides both functions, but it is preferred that at least about 20 percent of the total fluidizer be a neutral surfactant.

Silicas employed in the electrofluids of this invention may have low or high surface-area-to-weight ratios, about 0.5 square meter per gram of silica or more. The silica particles should be of an average size in the range of about 0.04 to 10 microns diameter. The silica will preferably be in the form of a xerogel having a surface area well in excess of 10 square meters per gram, and preferably have an average particle size of 0.06 to 2.0 microns diameter. Commercial xerogels are available having average aggregate particle sizes as small as about 0.4 micron. Additional grinding in micronizer equipment can reduce the particle size of other silicas to within the preferred range. The free-water content of the electrofluid can be adjusted by adding free water, either before or after the silica is compounded in the fluid, but the addition of water after compounding does not provide the requisite number of hydroxyl groups on the silica, where the silica before being compounded in the electrofluid did not possess the requisite number of groups.

The effect of silica-bonded hydroxyl groups and free water on the force-transmitting capacity of silica-base electrofluids has been demonstrated by laboratory experiments. The results of these experiments are shown in Table I, and in graphic form in FIGURE 1.

TABLE I

*Effect of water content and type on silica-base electrofluids*

| Formula Number | 1 | | | 2 | | | 3 | | |
|---|---|---|---|---|---|---|---|---|---|
| Wt. percent $H_2O$ on $SiO_2$ | 13.46 | | | 13.06 | | | 12.42 | | |
| Silica Volume Fraction | 0.465 | | | 0.465 | | | 0.465 | | |
| Oleate Molecules/$m\mu^2$ | 0.83 | | | 0.83 | | | 0.83 | | |
| | Gms. | Cc. | Weight percent | Gms. | Cc. | Weight percent | Gms. | Cc. | Weight percent |
| Composition: | | | | | | | | | |
| Silica, dry | 1.000 | 0.467 | 55.82 | 1.000 | 0.476 | 55.61 | 1.000 | 0.476 | 55.28 |
| Water on Silica | 0.155 | 0.155 | | 0.150 | 0.150 | | 0.142 | 0.142 | |
| Glycerol Monooleate | 0.366 | 0.390 | 17.69 | 0.366 | 0.390 | 17.70 | 0.366 | 0.390 | 17.70 |
| 85 vis Neutral | 0.548 | 0.648 | 26.49 | 0.552 | 0.653 | 26.69 | 0.558 | 0.661 | 27.01 |
| Totals | 2.069 | 1.669 | 100.00 | 2.068 | 1.669 | 100.00 | 2.066 | 1.669 | 100.00 |
| | Force, oz./in.² | | Cond., ma. | Force, oz./in.² | | Cond., ma. | Force, oz./in.² | | Cond., ma. |
| | A.C. | D.C. | | A.C. | D.C. | | A.C. | D.C. | |
| Electrofluid Characteristics: | | | | | | | | | |
| Initial | 34 | 2 | 8.5 | 39 | 4 | 6.0 | 50 | 14 | 1.6 |
| RT Avg.* | 38 | 1 | 8.0 | 46 | 10 | 5.4 | 49 | 12 | 1.2 |
| 150° F.** | 44 | 8 | 5.0 | 45 | 10 | 3.9 | 47 | 16 | 0.8 |
| Overall Average | 41 | 4 | 6.5 | 45 | 5 | 4.6 | 48 | 14 | 1.0 |

See footnotes at end of table.

TABLE I.—Continued

| Formula Number | 4 | | | 5 | | | 6 | | |
|---|---|---|---|---|---|---|---|---|---|
| Wt. percent H$_2$O on SiO$_2$ | 11.58 | | | 10.87 | | | 10.53 | | |
| Silica Volume Fraction | 0.465 | | | 0.465 | | | 0.465 | | |
| Oleate Molecules/m$\mu^2$ | 0.83 | | | 0.83 | | | 0.83 | | |
| | Gms. | Cc. | Weight Percent | Gms. | Cc. | Weight Percent | Gms. | Cc. | Weight Percent |
| Composition: | | | | | | | | | |
| Silica, dry | 1.000 | 0.476 | } 54.77 | 1.000 | 0.476 | } 54.39 | 1.000 | 0.476 | } 54.19 |
| Water on Silica | 0.131 | 0.131 | | 0.122 | 0.122 | | 0.118 | 0.118 | |
| Glycerol Monooleate | 0.366 | 0.370 | 17.72 | 0.366 | 0.390 | 17.74 | 0.366 | 0.390 | 17.74 |
| 85 vis Neutral | 0.568 | 0.672 | 27.51 | 0.575 | 0.681 | 27.87 | 0.579 | 0.685 | 28.07 |
| Totals | 2.065 | 1.669 | 100.00 | 2.063 | 1.699 | 100.00 | 2.063 | 1.669 | 100.00 |

| | Force, oz./in.$^2$ | | Cond., ma. | Force, oz./in.$^2$ | | Cond., ma. | Force, oz./in.$^2$ | | Cond., ma. |
|---|---|---|---|---|---|---|---|---|---|
| | A.C. | D.C. | | A.C. | D.C. | | A.C. | D.C. | |
| Electrofluid Characteristics: | | | | | | | | | |
| Initial | 50 | 15 | 0.3 | 66 | 9 | 0.2 | 59 | 9 | 0.1 |
| RT Avg.* | 50 | 14 | 0.3 | 56 | 11 | 0.2 | 53 | 13 | 0.1 |
| 150° F.** | 49 | 13 | 0.2 | 50 | 14 | 0.1 | 55 | 16 | 0.1 |
| Overall Average | 50 | 14 | 0.75 | 53 | 12 | 0.15 | 54 | 14 | 0.1 |

| Formula Number | 7 | | | 8 | | | 9 | | |
|---|---|---|---|---|---|---|---|---|---|
| Wt. Percent H$_2$O on SiO$_2$ | 9.57 | | | 8.09 | | | 6.86 | | |
| Silica Volume Fraction | 0.465 | | | 0.465 | | | 0.465 | | |
| Oleate Molecules/m$\mu^2$ | 0.83 | | | 0.83 | | | 0.83 | | |
| | Gms. | Cc. | Weight Percent | Gms. | Cc. | Weight Percent | Gms. | Cc. | Weight Percent |
| Composition: | | | | | | | | | |
| Silica, dry | 1.000 | 0.476 | } 53.66 | 1.000 | 0.476 | } 52.87 | 1.000 | 0.476 | } 52.24 |
| Water on Silica | 0.106 | 0.106 | | 0.088 | 0.088 | | 0.074 | 0.074 | |
| Glycerol Monooleate | 0.366 | 0.390 | 17.76 | 0.366 | 0.390 | 17.78 | 0.366 | 0.390 | 17.80 |
| 85 vis Neutral | 0.589 | 0.685 | 28.58 | 0.604 | 0.715 | 29.35 | 0.616 | 0.729 | 29.96 |
| Totals | 2.061 | 1.669 | 100.00 | 2.058 | 1.669 | 100.00 | 2.056 | 1.669 | 100.00 |

| | Force, oz./in.$^2$ | | Cond., Ma. | Force, oz./in.$^2$ | | Cond., Ma. | Force, oz./in.$^2$ | | Cond., Ma. |
|---|---|---|---|---|---|---|---|---|---|
| | A.C. | D.C. | | A.C. | D.C. | | A.C. | D.C. | |
| Electrofluid Characteristics: | | | | | | | | | |
| Initial | 52 | 7 | 0.0 | 45 | 14 | 0.0 | 18 | 7 | 0.1 |
| RT Avg.* | 47 | 11 | 0.0 | 34 | 12 | 0.0 | 17 | 8 | 0.0 |
| 150° F.** | 48 | 14 | 0.0 | 29 | 13 | 0.0 | 17 | 7 | 0.0 |
| Overall Average | 48 | 12 | 0.0 | 31 | 12 | 0.0 | 17 | 7 | 0.0 |

\* Average of 3 room temperature storage checks.
\*\* Average of 4 checks after storage at 150° F.

Each of the 9 formulations was substantially the same except for the total water content of the silica. The silica was a 745-square-meter-per-gram, commercial-grade desiccant silica having an average particle size of about 1 to 2 microns, and a porosity of about 0.3 cubic centimeter per gram. As received, the silica had a total water content (water as hydroxyl groups plus free water) of about 6.1 weight percent, and less than 6 silica-bonded hydroxyl groups per square millimicron of surface area. In preparing each formulation tested, the silica was first treated to increase the total water content, and reacted to form about 8 silica-bonded hydroxyl groups per square millimicron of surface area. The silica was then treated in batches to reduce the total water content to the amounts indicated, without reducing the number of hydroxyl groups, except in the cases where the water content was reduced to below about 8.2 weight percent, the amount necessary to provide the maximum silanol content. Thus formulations having less than 8.2% total water possessed substantially no free water and a hydroxyl-group content substantially equivalent stoichiometrically to the total water content. The formulations are not represented as optimum fluids, but as illustrative of the criticality of water content. The silica selected, while not necessarily optimum, is excellent for this purpose since each one percent by weight of water is almost exactly equivalent stoichiometrically to one hydroxyl group, or to one-half molecule of free water adsorbed per square millimicron of silica surface.

In these and all other experiments reported herein, static D.C. forces were measured by placing a quantity of the fluid on a base plate, leveling it with the edge of a spatula, and positioning a moveably supported parallel plate on the electrofluid. The force required to move the plate parallel to the base plate, thus shearing the electrofluid layer, is the reported force, expressed per unit of plate area. Standard test conditions for D.C. measurements were 600 volts applied between plates with the moveable plate supported at a distance of 0.0025 inch above the base plate. Static A.C. forces were measured using a plate similarly supported 0.001 inch above the barium titanate surface of a standard, 3-electrode chuck. Standard conditions of 2000 volts R.M.S. per phase, 3 phase, applied to adjacent electrodes 120° out of phase, were employed.

In addition to the above reported experiments, tests were performed which established that only very low forces could be obtained from fluids in which the silica contained less than the prescribed hydroxyl content, regardless of the free water content. These results have been confirmed for a variety of silicas of different surface-area ratios, including non-porous silica. Porous and non-porous silicas having surface areas in excess of about 0.5 square meter per gram are useful in compounding the electrofluids of this invention.

The prior art teaches the use of infrared-ray adsorption studies and differential thermal analysis for determining the content of free water and chemically combined water in silica. These methods have not proved to be altogether reliable and satisfactory for evaluating silicas which have particle sizes above 0.1 micron. While the use of any silica having the prescribed qualities is contemplated in the compounding of electrofluids in accordance with this invention, it is preferred that the silica be treated as hereinafter described to insure that it will meet essential requirements as to silica-bonded hydroxyl groups and free-water content. In accordance with the teachings of the prior art, silica surfaces normally are covered with a partial mono-layer of hydroxyl groups, generally termed bound water. The prior art also teaches that when silica is heated even to 500° C., this layer is partly removed without sintering the silica. The surface is left in a dehydrated, oxide condition which will not physically adsorb water, but which can be slowly rehydrated upon exposure to water.

The mono-layer of hydroxyl groups is recognized by the prior art as being made up of units called silanol groups (SiOH), and removal of hydroxyl groups in the form of water from these groups results in a partially dehydrated surface made up of siloxane groups. Thus, partially dehydrated silica surfaces are made up of both silanol and siloxane groups. Silica surfaces having silanol groups can also contain what is called "free water" or "physically adsorbed" water. This water is believed to be attached to the silanol groups through hydrogen bonding. It is more readily removed than the silanol water by evaporation from the silica surface. As used in the claims "free water" means the same as above defined. Because siloxane groups do not exhibit the adsorptive capacity of silanol groups, it is believed that adsorption on a silica surface occurs predominantly at the silanol sites. In addition to the bound and free water, the silica can also contain excess water occluded in pores and wetting the surface. This water is also readily removed by evaporation. Siloxane silica can be depicted as:

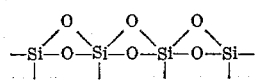

silanol (silica-bonded, hydroxyl-group-containing) silica can be depicted as:

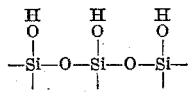

and silanol silica containing free water can be depicted as:

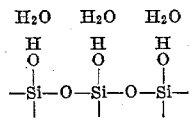

Of course, fewer than all the potential silanol sites may be hydroxylated, and fewer than all the hydroxylated sites may have free-water molecules coordinated therewith. Theoretically, the maximum number of potential silanol sites is about 8 sites per square millimicron of silica surface area.

The prior art has indicated that the silanol content of particulate silica can be increased to the maximum possible value by contacting silica with liquid water, allowing a short time for reaction to occur, and removing the excess liquid water by evaporation at elevated temperatures. The prior art has also indicated that the reaction of water in the vapor phase with siloxane silica to produce silanol silica is either impossible or so slow as to be impractical. This would be unfortunate, because silica which has been hydrated with liquid water tends to agglomerate during the drying operation, requiring that it be ground or otherwise broken into requisite small particle sizes. This regrinding is expensive, and the problem is made more difficult by the fact that grinding exposes new particle surfaces which are not necessarily hydroxylated surfaces. Thus, upon the fracture of a silica particle which formerly possessed the maximum number of silanol groups over its exposed surfaces, two or more particles are formed, certain surfaces of which may possess few, if any, silanol groups. In this way, the average silanol content per unit surface area may be dramatically reduced. In any event, the surface condition of the particles thus manufactured is not uniform.

It has now been found that these difficulties can be avoided by a new method of increasing the silanol content of silica, the method being based upon the use of water in the vapor phase. Thus the agglomeration of particles is avoided, and the necessity for regrinding eliminated.

In accordance with this method, the silanol content of silica containing less than the maximum number of theoretically possible silanol groups per unit surface area is increased by contacting the particulate silica with an atmosphere containing water vapor having a partial pressure greater than the partial pressure of water present on the silica until the total water content of the silica is increased to at least about 8 molecules of free water per square millimicron of silica surface area. Sufficient time is then allowed for the siloxane-water reaction to become substantially complete. Free water may then be removed from the silica to leave the desired number of silanol groups on the silica surface, together with the desired amount of free water.

The reaction can be carried out at temperatures from ambient up to about 200° C. At room temperature, a practical silanol formation rate is achieved only when sufficient water is added to the silica surface to provide the stoichiometric amount necessary for the formation of the silanol groups plus nearly one molecule of water per silanol group. Thus, to place upon the silica a surface coating of the maximum of about 8 silanol groups per square millimicron of surface area, it is necessary to have adsorbed on the silica the stoichiometric amount of water for the 8 silanol groups (about 4 molecules per square millimicron) plus about one molecule of water per silanol group (8 molecules of water per square millimicron of surface area). Thus, one way to obtain the desired rapid rate of reaction, is to contact the silica at room temperature with a humid atmosphere until the water content is about 12 molecules of water per square millimicron of silica surface area. When, however, the silica is treated at elevated temperatures, a practical silanol-formation rate is achieved at lower water contents. In general, the amount of water needed then is only that sufficient to provide the stoichiometric amount of silanol water plus about one-half molecule of water per silanol group. Thus, at elevated temperatures, the reaction will proceed to completion in a reasonable time when about 8 molecules of water have been adsorbed on the silica per square millimicron of silica surface area.

The silica is most conveniently hydrated by contacting it with an atmosphere containing water vapor at a partial pressure in excess of the partial pressure of water on the silica. Preferably, the atmosphere will be substantially saturated with water vapor, the atmosphere containing a gas such as nitrogen or air to act as a carrier. The extent of hydration of the silica can readily be determined by the weight increase of the sample. When the silica has been hydrated to the desired extent, it is permitted to age so the siloxane-water reaction can take place. During this time, the adsorbed water must not be permitted to evaporate from the silica. This can most easily be accomplished by enclosing the silica sample. At ambient temperatures, the aging period for complete reaction is less than 6 days when about 12 molecules of water per square millimicron of silica surface area have been adsorbed. When about 8 molecules of water per square millimicron have been adsorbed, the reaction period will be about 12 to 16 days. When less than 8 molecules per square millimicron have been adsorbed, reaction is incomplete even after 30 days. When the reaction is conducted at elevated temperatures (about 150 to 160° C.), a period of about 6 days is sufficient with a water content of about 8 molecules per square millimicron of silica surface area.

Silica processed as aforedescribed will have a silanol content of about 8 groups per square millimicron of silica surface area, and will in addition contain free water in the amount of at least about 4 molecules per square millimicron of silica surface area. It is therefore desirable to partially dehydrate the silica to place the free water content in the preferred range for compounding in electrofluids, but this must be done without substantially decreasing the silanol content of the silica.

The prior art teaches that the silanol content of silica is not reduced by dehydration at temperatures as high as 160° C. Unfortunately, it has been found that contrary to this prior art teaching, at least part of the chemically bound silanol water is removed at a significant rate, even at temperatures as low as 100° C., unless certain critical conditions are maintained. It has further been found that if the dehydration is carried out by evacuation, the decomposition of silanol groups can occur at even lower temperatures.

The removal of silanol groups at temperatures as low as 100° C. has been demonstrated by a series of experiments in which commercial silica having a surface area of 745 meters per gram was contacted with liquid water for a sufficient time to cause the formation of the maximum number of silanol groups per unit surface area. Nine- to twelve-gram samples of the silica were placed in Erlenmeyer flasks, and sufficient water was added to each to prepare a series of slurries containing about 40% silica and 60% water. The samples were then placed in an oven and maintained at a temperature of 101° plus or minus 1° C., and were heated for various lengths of time. The condition of the atmosphere within the oven was not regulated except as to temperature. The results were as follows:

TABLE II

| Sample | Time at 100° C. (hours) | Percent H$_2$O Final |
|---|---|---|
| A | 21 | 6.8 |
| B | 45 | 6.9 |
| C | 69 | 6.8 |
| D | 92 | 6.9 |

The final water content of the samples was determined by calcining the samples at 1000° C. for 3 hours, and determining the percent of volatile content. For this particular silica, 8 silanol groups per square millimicron of surface area is equivalent to 8.2% water by weight. Thus it is apparent that heating the wet silica at 101° C. destroyed part of the silanol groups, since insufficient water remained on the silica to support even 7 silanol groups per square millimicron of surface area. The amount of water necessary to provide each silanol unit per square millimicron of silica surface area can be calculated from the formula:

$$\text{silanol groups/sq. mu} = \frac{66,900 \, W}{A \, (100 - W)}$$

where W is the weight percent of water upon the silica, based upon dry silica, and A is the surface area of the silica expressed in square meters per gram.

It has been found that silica containing about 8 silanol groups per square millimicron of surface area can be dehydrated to the point at which substantially all free water has been removed, without the destruction of silanol groups, by dehydration at a temperature in the range of about 100 to 120° C., provided that the atmosphere above the silica is maintained at a water-vapor pressure in excess of the water-vapor pressure of the silanol groups at the prevailing temperature. This is most conveniently accomplished by heating the silica to a temperature within the range of about 100 to 120° C., in a substantially closed vessel having outlet means sufficient to prevent the buildup of pressure within the vessel. Thus the atmosphere within the vessel, which may comprise air and water vapor, is nearly saturated with water vapor, and the vapor pressure of the water in the atmosphere exceeds that of the vapor pressure of the silanol groups bonded to the silica. This technique is apparently made possible by the fact that in the temperature range of about 100 to 120° C., there is substantially no overlap of the equilibrium vapor-pressure range of the silanol groups, which is a function of the number of silanol groups existing per unit surface area, and the equilibrium vapor pressure of the free-water content of the silica, which is a function of the number of free-water molecules present per unit surface area.

A series of experiments was run to demonstrate this dehydration technique. In this series of experiments, a 745-sq.-meter-per-gram silica was hydrated to a water content of about 21 weight percent (equivalent to about 8 silanol groups plus about 8 molecules of free water per sq. mu.), and then was divided into several portions and placed in Petri dishes. The dishes were covered with aluminum foil which was sealed around the dish by means of a soft wire. Then the dishes were placed in an oven at 101°, plus or minus 1° C., and maintained at that temperature for various lengths of time. Finally, the water contents of the partially dehydrated samples were determined by heating weighed portions of the samples at 1000° C. for three hours, to determine the volatile content thereof. The results were as follows:

TABLE III

| Sample Number | Hours at 101° C. | Final Water Content (Percent wt.) |
|---|---|---|
| 1 | 20 | 16.78 |
| 2 | 26 | 14.92 |
| 3 | 32 | 12.55 |
| 4 | 38 | 13.90 |
| 5 | 44 | 12.74 |
| 6 | 50 | 10.69 |
| 7 | 56 | 10.91 |
| 8 | 62 | 10.46 |
| 9 | 62 | 10.07 |
| 10 | 62 | 10.05 |
| 11 | 68 | 10.14 |

It is apparent that the dehydration stopped at a water content of about 10.1% by weight at 101° C. when the silica was in contact with an equilibrium atmosphere. This is equivalent to about 8 silanol groups plus one molecule of free water per square millimicron of surface area.

In another experiment, the temperature was maintained at 110° plus or minus 1° C. At the end of 56 hours, the water content of a sample, determined as above described, had diminished to 8.39% by weight; and at the end of 75 hours the water content still was 8.09% by weight, indicating that water removal at 110° C. under an equilibrium atmosphere had ceased with a substantial removal of all free water from the sample, but without a substantial decrease in the silanol content of the sample. The remaining water content was about equal to the 8.2% water required for 8 silanol groups per square millimicron of surface area on the tested silica having a surface area of about 745 meters per gram.

As a specific example of the method of increasing the silanol content of silica and then adjusting the free water content of the silica to a desired value, a silica sample having a total water content of about 6% by weight and a surface area of 745 square meters per gram was hydrated by contact with a moist atmosphere at 25° C. The atmosphere contained water vapor in an amount sufficient to provide a vapor pressure of about 23 millimeters of mercury. This atmosphere was circulated through the silica until a total water content of 21% by weight of water was adsorbed by the silica. This amounted to the stoichiometric amount of water required to provide 8 silanol groups plus about 8 molecules of free water per square millimicron of surface area. The silica sample was then placed in a closed vessel for a reaction period of 5 days. The vessel was placed in an oven at a temperature of $101 \pm 1°$ C. for a period of 56 hours. The pressure within the vessel was maintained at atmospheric pressure by permitting the escape therefrom of water vapor evolved from the sample. The final water content of the sample after treatment was determined to be 10.91% by weight.

As another example of the preparation of silica in accordance with this invention, a sample of a silica having a surface area of 37 square meters per gram and a total water content of 0.25 weight percent is hydrated by contacting the silica at a temperature of 150° C. in an autoclave with steam in an amount sufficient to provide a partial pressure of about 65 p.s.i. The silica is held at 150° C. in this atmosphere until no more steam is required to maintain the pressure—about 12 hours. The silica is then cooled in the sealed vessel to 110° C. and excess steam is removed by venting the vessel to atmospheric pressure. The final water content of the silica is 10.66 weight percent. The silica thus has about 8 silanol groups and about two molecules of free water per square millimicron of surface area.

It has been pointed out that the partial pressure of water vapor in the atmosphere above the silica during reaction need not be saturation pressure, provided the partial pressure is in excess of the partial pressure of silanol groups on the silica at the prevailing temperature. Conversely, during dehydration it is only necessary that the partial pressure of water above the silica be below the water-vapor pressure of the silica at its temperature. Dehydration stops when the water-vapor partial pressure above the silica is equal to that of the silica vapor pressure at the silica temperature.

Electrofluids compounded in accordance with this invention will contain in excess of about 10 percent by volume of silica, and usually about 20 to 55 percent by volume of silica. At volumes below about 10 percent, only very low forces are obtained. It has been found that highest forces are obtained when the amount of silica is sufficient to provide in the electrofluid an average particle spacing of about 0.01 to 0.03 micron between particles. The volume of silica required is dependent upon the silica particle size, and can be calculated from the formula:

$$Y = D\left(\frac{0.806}{\phi^{1/3}} - 1\right)$$

where:

Y is the average distance between particles,
D is the average particle diameter, and
$\phi$ is the volume fraction of silica in the electrofluid.

The volume fraction, which is expressed as a decimal number, is merely the ratio of the volume of the silica to the volume of the electrofluid compounded therefrom. It is calculated on the basis of "enclosed volume," which is the volume which would be bounded by the exterior surfaces of a particle, assuming the surface to be non-porous. Enclosed volume may be calculated on the basis of the density only for non-porous particles, or on the basis of skeletal density and pore volume for porous particles. Thus the volume of a quantity of silica, whether porous or non-porous, is the sum of the volumes of the particles, taken as above described. This is obviously less than the volume which the quantity of silica will occupy in a dry measure.

The oleaginous vehicle in which the silica is dispersed is preferably a refined mineral oil fraction having a viscosity within the range of about 50 to 300 SUS at 100° F., and an initial boiling point greater than about 500° F. A wide variety of non-polar oleaginous materials having a dielectric constant not greater than about 5, and which are only weakly adsorbed by silica, can be employed. Examples of suitable materials include white oils, lubricating oil stocks such as 85 vis neutral oil, and various synthetic oils. Examples of synthetic oils which may be employed are those such as are commonly used as transformer oils, and synthetic oils resulting from polymerization of unsaturated hydrocarbons, polyfluoro derivatives, or organic compounds, especially fluorinated hydrocarbons in the lubricating-oil viscosity range. The vehicle is preferably a material which is only weakly adsorbed by silica, such as paraffins, olefins, and aromatic hydrocarbons, all of which are weakly adsorbed, the degree of adsorption increasing in the order stated. The vehicle can be considered to be only weakly adsorbed when it is less strongly absorbed by the silica employed in the electrofluid than are the other essential constituents of the electrofluid, i.e., the fluidizer and basic nitrogen compound employed.

When silica is incorporated in a suitable oleaginous vehicle to compound an electrofluid, the silica thickens the vehicle to a certain extent. At high silica-volume fractions, the mixtures takes on the characteristics of a heavy grease. Where volumes of silica in the preferred range, i.e., sufficient to provide a particle spacing of 0.01 to 0.03 micron, as calculated above, are incorporated in the electrofluid, it is usually necessary to add a material to fluidize the mixture and keep the viscosity of the product electrofluid at a reasonable level. For this purpose, varying amounts of a neutral surfactant can be incorporated to maintain the mixture of silica and vehicle as a fluid, or thixotropic suspension. Suitable neutral surfactants are selected from the polyoxyalkylene ethers, hydroxyethers, and polyhydroxyethers and esters, as well as neutral sulfonates and other neutral surfactants. Other neutral polar organic materials, such as $C_2$ to $C_{30}$ mono- or polyhydric alcohols, are suitable fluidizers. Suitable neutral fluidizers include glycerol mono-oleate, sorbitan sesquioleate, glycol mono-oleate, alkyl aryl polyether alcohols, sodium dialkylsulfo-succinate, hexyl ether alcohol, butyl Cellosolve, octyl alcohol and dodecyl alcohol. The neutral fluidizer must be added in quantites sufficient to fluidize the mixture of vehicle and silica, but no more than is necessary to obtain sufficient fluidity should be used. Larger amounts of fluidizer decrease the electroactivity of the product fluid. Thus, the minimum amount necessary to provide fluidity should be added, if, indeed, any fluidizer is employed at all. The amount added will seldom exceed about 25 percent by volume except for high-porosity (not less than 0.4 cubic centimeter per gram) silicas. The exact amount used depends upon the silica volume fraction, silica surface area, silica pore volume, free-water content, and the fluid consistency desired. Generally, the maximum volume of fluidizer will not exceed 1.2 times the pore volume of porous silicas, or a volume equivalent to 2.5 molecules/mu$^2$ of external surface area for non-porous silicas.

Figure 2:
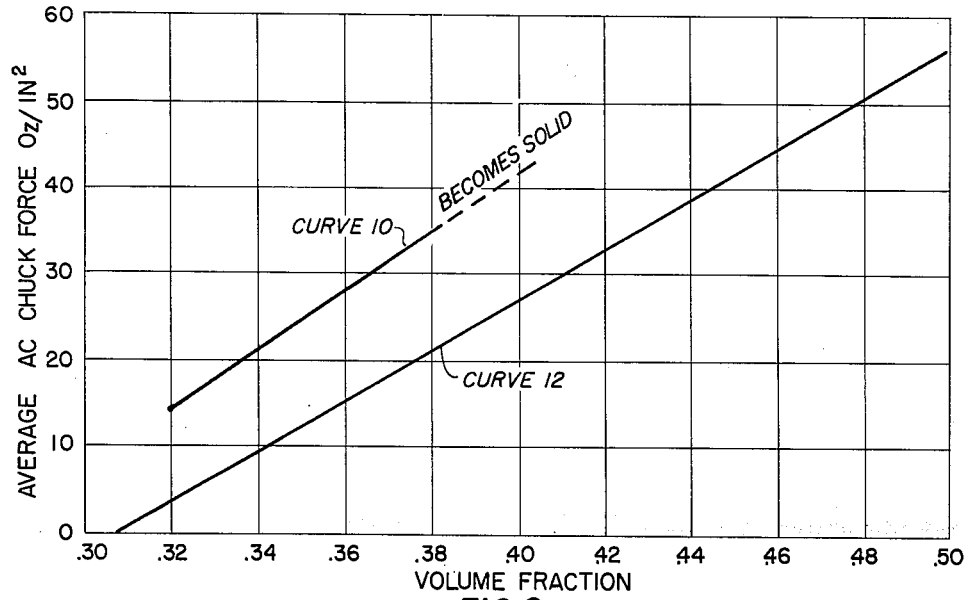

The effect of fluidizer on electrofluid compositions is demonstrated by FIGURE 2. Curve 10 depicts the relationship between holding force and silica-volume fraction for a formulation containing no fluidizer. Curve 12 depicts the same relationship for a similar formulation containing glycerol mono-oleate as fluidizer. It will be observed that for any given volume fraction of silica, the presence of the fluidizer decreases the holding force of the fluid. The fluidizer also permits the compounding of a fluid product having substantially higher silica content, and therefore higher force-transmitting capacity.

The afore-enumerated materials are the only essential ingredients of a transient-potential-activated electrofluid. It is sometimes desirable additionally, to add to transient-potential-activated electrofluids a small amount, in the range of about 0.2 to 1.0 molecule per square millimicron of silica surface area, of a carboxylic acid having a molecular weight not in excess of about 200. Especially preferred is the use of an amount of acetic acid within this range. It has been found that the addition of a small amount of carboxylic acid has a slight beneficial effect upon the phase stability of the product formulation. Electrofluids thus compounded can be stored for long periods of time without apparent separation of the vehicle and silica.

Where the electrofluid is intended for activation by a constant potential, it is necessary to incorporate in the fluid about 0.1 to 25 percent by volume of a basic, nitrogen organic compound. The preferred basic-nitrogen organic compounds employed with constant-potential-activated electrofluids are substituted or unsubstituted amines and imidazolines. The compound can be high or low in molecular weight, may or may not have fluidizing properties, and can contain other functional groups. It has been found that primary, secondary and tertiary amines, aminoalcohols, aminoethers, and diamines are effective. Effective primary amines include butylamine, hexylamine, ethanolamine, and 2-aminoethylamine, as well as others. Effective secondary amines include diethylamine, diisopropylamine, dibutylamine, pyridine, morpholine, and diethanolamine, as well as others. Effective tertiary amines include triethylamine and triethanolamine, as well as others. However, although pyridine, aniline, and methylaniline are effective, their use is not recommended as better results are obtained with more basic amines.

In compounding electrofluids in accordance with this invention, the fluidizer is first blended with all of the other organic components to be incorporated in the fluid, and the organic components are thoroughly mixed. The silica is then added as rapidly as possible to the blend of organic ingredients, preferably over a blending period of less than one hour. The compounded electrofluid may then be milled in a three-roll mill until it is fluid and uniform. Satisfactory silica cannot be prepared by mere adsorption or addition of water in the desired amount to the silica, either before or after compounding the fluid, if the silica does not have the required silanol groups. It is necessary to effect a reaction of siloxane groups with water to form silica-bonded hydroxyl groups before the silica is compounded into an electrofluid. Thus, identical formulation of transient-potential-activated electrofluids were prepared, using silica with varying numbers of silica-bonded hydroxyl groups per square millimicron of surface area, adding water to each formulation so that each had a total water content equivalent to that required to provide eight silica-bonded hydroxyl groups per square millimicron of surface area, and 1.4 molecules of free water per square millimicron of surface area. A sample fluid containing silica initially having about eight silica-bonded hydroxyl groups per square millimicron of surface area responded to the addition of free water and evidenced stable forces of 60 to 70 ounces per square inch under A.C. activation. However, the sample prepared with silica having less than six silanol groups per square millimicron of surface area did not respond to the addition of water. It displayed forces of only ten to fifteen ounces per square inch. Neither prolonged storage, nor milling, nor heating, nor further addition of water caused a rise in force. It is evident that water cannot be added to compounded fluids to produce a satisfactory electrofluid unless the silica already has the requisite amount of hydroxyl groups. It is further evident that the chemical nature of the water in the electrofluid (whether as hydroxyl groups or free water) is critical.

In another experiment, water vapor was adsorbed directly onto silica having less than six silica-bonded hydroxyl groups per square millimicron of surface area, until sufficient water was adsorbed by the silica to provide eight hydroxyl groups per square millimicron of surface area plus 1.4 molecules of free water per square millimicron of surface area. The added water was not chemically combined with the silica, there still being less than 6 silanol groups. Again, an unsatisfactory electrofluid was obtained. It was almost solid, was dilatant, and showed A.C. forces of only 10 to 20 ounces per square inch.

Referring again to FIGURE 1, the coupling forces exhibited by the fluid, measured in ounces per square inch of surface area, are plotted as the ordinate, and the total water molecules per square millimicron of surface area, are plotted as the abscissae. It will be observed that the force characteristics of the resulting fluids increased rapidly as the number of silanol groups per square millimicron of surface area approached the maximum value of about eight (observe the approximate stoichiometric equivalence of percent water and silanol content for this specific silica), and the force characteristic continued to increase until a free water content of about one molecule per square millimicron of surface area was reached. The curve then turns downward and the force-transmission capability of the fluid decreases as the water content continues to rise. A similar family of curves exists for constant-electric-field-activated electrofluids, although the critical lower limit of silanol content of such fluids is lower than that for transient-potential-activated fluids. It is noted in passing that all known constant-potential-activated electrofluids also respond to a transient potential, but electrofluids which do not include the basic nitrogen component display transient-field activity only, and are nearly inert in the presence of a constant-potential electric field under the test conditions employed.

As a specific example of the compounding of an electrofluid in accordance with this invention, an electrofluid is compounded using a silica having a surface area of 745 square meters per gram, a pore volume of 0.3 cubic centimeters per gram, a water content of 10.4 weight percent equivalent to a silica-silanol content of eight groups, a free-water content of 1.2 molecules per square millimicron of surface area, and an average particle size ranging from about 1 to 2 microns diameter. It is intended that the product electrofluid should comprise 45 volume percent silica and be fluid when compounded with 85 viscosity neutral oil.

A volume fraction of 0.45 requires that the enclosed volume of the particles be equal to 0.45 cubic centimeter for each cubic centimeter of electrofluid. The enclosed volume equals the volume obtained by skeletal density plus the pore volume. Using 2.1 grams per cubic centimeter as the skeletal density of silica, one gram of silica equals 0.4762 cubic centimeter. This amount plus the pore volume, 0.3000 cubic centimeter per gram of silica, is equal to 0.7762 cubic centimeter enclosed volume for one gram of silica. This amount is 0.45 times the total volume of electrofluid, therefore, the total volume of electrofluid is 1.7249. The actual volume of components other than silica must then be $1.7249 - .4762 = 1.2487$ cubic centimeter for each gram of dry silica. One gram of dry silica weighs $$\frac{1}{1-.104}$$

or 1.1161 grams when 10.4% water is present. Therefore, 1.1161 grams of silica with 10.4 weight percent water is composed of 1.0000 gram of silica and 0.1161 gram of water.

Since a fluid electrofluid is wanted, the maximum amount of fluidizer, or 0.3 cubic centimeter per gram of silica (the pore volume amount), will be used. Glycerol monooleate has a density of 0.939 gram per cubic centimeter, therefore 0.2817 gram of the oleate will be employed. We now have 1.0000 gram or 0.4762 cubic centimeter of silica, 0.1161 gram or cubic centimeter of water, and 0.2817 gram or 0.3000 cubic centimeter of glycerol monooleate in the formula. The balance, 1.7249 minus .4762 minus .1161 minus .2817, or 0.8326 cubic centimeter, must be the 85 viscosity neutral oil. This amount weighs 0.7035 gram with a density of 0.845 gram per cubic centimeter. The final formula then is:

| Component | Grams | Cubic Centimeter | Weight Percent | Volume Percent |
|---|---|---|---|---|
| Silica | 1.0000 | .4762 | 47.59 } 53.11 | 27.61 } 34.34 |
| Water | .1161 | .1161 | 5.52 | 6.73 |
| Fluidizer | .2817 | .3000 | 13.41 | 17.39 |
| Oil | .7035 | .8326 | 33.48 | 48.27 |
| Totals | 2.1013 | 1.7249 | 100.00 | 100.00 |

Accordingly, a 10,000-gram batch was prepared in a 3-gallon experimental grease kettle by charging 3348 grams of the oil and 1341 grams of glycerol monooleate, and blending. To this blend, 5311 grams of silica with 10.4 percent water was added rapidly (less than twenty minutes).

The resultant mixture was at first grease-like in consistency and dilatant. However, after stirring for a total of eight to twelve hours, the mixture became a thixotropic fluid. Stable A.C. forces of 60 oz./in.$^2$ under standard test conditions were obtained. D.C. forces were very low, on the order of 5–10 oz./in.$^2$. This fluid had a high resistance and was far superior in stability and force characteristics.

As a second example, a similar electrofluid was desired using a non-porous silica having a surface area of 6.0 M$^2$ per gram and an average particle size of 1.1 microns. Since the silica is non-porous, a volume fraction of 0.45 requires only $$\frac{0.4762}{0.45}$$

or 1.0582 cubic centimeter total volume per gram or per 0.4762 cubic centimeter of silica in the formula. The water content of the silica need be only 0.11 weight percent for 8 silanol groups plus 2 molecules of water per square millimicron. However, the silica on hand had 0.4 weight percent volatiles at 1000° C. for three hours. Experiments on the surface state of this silica indicated that approximately 70 percent of these volatiles were not water and could not be removed without disturbing the silanol content of the silica. Consequently, the silica was used as it was, assuming these impurities to have a density of about 1 gram per cubic centimeter.

Since the volatile content was about 0.4 weight percent, one gram of dry silica weighed 1.0040 grams and had a volume of 0.4762+0.004 cubic centimeter=0.4802 cubic centimeter. Since there is no pore volume, 2.5 molecules of fluidizer per square millimicron must be used to obtain a fluid electrofluid. This amounts to 0.0089 gram or 0.0095 cubic centimeter of glycerol monooleate per gram of dry silica. We now have 1.0000 gram or 0.4762 cubic centimeter of silica, 0.0040 gram or cubic centimeter of volatiles, and 0.0089 gram or 0.0095 cubic centimeter of glycerol monooleate. We then need 1.0582 minus .4762 minus .004 minus .0095 cubic centimeter, or 0.5685 cubic centimeter of vehicle. With 85 viscosity neutral as the vehicle, 0.5685 cubic centimeter is 0.4804 gram.

The equivalent formula for this electrofluid may be summarized as follows:

| Component | Grams | Cubic Centimeter | Weight Percent | Volume Percent |
|---|---|---|---|---|
| Silica | 1.0000 | 0.4762 | 66.96 } 67.23 | 45.00 } 45.38 |
| Volatiles | 0.0040 | 0.0040 | 0.27 | 0.38 |
| Fluidizer | 0.0089 | 0.0095 | 0.60 | 0.90 |
| Oil | 0.4804 | 0.5685 | 32.17 | 53.72 |
| Totals | 1.4933 | 1.0582 | 100.00 | 100.00 |

This electrofluid was prepared in a 100-gram batch by blending 32.17 grams of 85 viscosity neutral with 0.60 gram of glycerol monooleate in a 400-cubic-centimeter beaker, with a spatula. To this blend, 67.23 grams of the silica were added all at once and stirred with the spatula. Initially, the mixture became almost solid, but after 10 minutes vigorous mixing became a thixotropic fluid. It exhibited stable A.C. forces of about 57 ozs./in.$^2$, which is equivalent to the electrofluid of Example 1.

The equivalence of the electrofluids of Examples 1 and 2 illustrate very well the marked differences in composition required to achieve an equivalent electrofluid using silicas of varying physical properties. The weight and volume percents of components required to achieve equivalent silica surface states and inter-particle distances vary tremendously with the surface area, particle size, and porosity of the particular silica. However, after much experimentation it has been found that these tremendous differences between silicas of widely varying physical characteristics can be resolved to relatively minor differences in electrofluid properties if volume fraction is taken to be the enclosed volume, the interparticle distance is related to particle size and enclosed volume fractions, and the fluidizer concentration is limited to that required to have no more than about 2–3 molecules of fluidizer per square millimicron of exterior silica surface area. The fluidizer concentration required for porous silicas is largely dependent upon the pore volume where this volume is equal to or greater than that required to give 2–3 molecules per mu$^2$ of exterior surface calculated from the average particle size. It is presumed that the silanol content of the silica surface will be controlled in any case where silica is used for electrofluids.

Electrofluid forces are related to the average distance between the particles suspended in the fluid medium. It has not been possible to calculate the actual distance between particles because of the large range of particle sizes present in the samples of silica and the uncertainty of the arrangement in the particle packing and possible nesting of smaller particles between the larger particles. If one assumes a uniform particle size based on the average particle size, and also assumes simple cubic packing, one can relate the distance between particles, Y, to the enclosed volume fraction ($\phi$) and particle diameter, D. Thus, as before stated, $$Y = D\left(\frac{0.806}{\phi^{1/3}} - 1\right)$$

Based upon these assumptions, the maximum enclosed volume fraction attainable is 0.524 regardless of particle size. In this case, the particles would have zero interparticle distance or be touching one another.

Since high-force fluid electrofluids have been achieved with enclosed volume fractions as high as 0.6, it is obvious that the above assumptions are not valid. Nevertheless, the formula derived from them is of considerable value since it gives a reference point from which particles of widely varying size and distribution can be evaluated as to electrofluid properties. While the distances between particles are not actually known, the relative distance can be calculated with a reasonable degree of certainty. Experimental results based on this formula indicate that electrofluid forces are highest at interparticle distances of 0.01 to 0.03 microns, and gradually fall off to near zero at distances of 0.2 to 0.3 microns. Equivalent or nearly equivalent electrofluids can be made with differing silicas if the enclosed volume fraction is adjusted to result in interparticle distances which are nearly equivalent.

As an example of the compounding of D.C.-activated electrofluids in accordance with this invention, the same silica, volume fraction, oil, and fluidizer as used in Example 1 are used. From the calculations given in that example, we have 1.000 gram or 0.4762 cubic centimeter of silica, 0.1161 gram or cubic centimeter of $H_2O$, and 0.7035 gram (or 0.8326 cubic centimeter) of 85 viscosity neutral oil. All of the fluidizer may be substituted with a basic compound on a volume basis, but preferably no more than 80 percent will be so substituted as fluidization may be only temporary above this level. With substitutions less than 10 percent, the D.C. activity obtained is almost negligible but an appreciable enhancement of the stable A.C. properties is achieved. Consequently, for certain A.C. fluids it is desirable to add up to 20 percent of the normal fluidizer volume content of a D.C. activator. At concentrations of D.C. activator above 20 percent volume of the normal fluidizer content, D.C. activity increases markedly to a very high level at about 80 percent substitution. However, best stability is attained when the substitution is within the limits of 25 to 75 percent, preferably around 50 volume percent.

With this in mind, the formula of the third example is chosen to have 50 percent volume of the fluidizer concentration as D.C. activator. The formula is:

| Component | Grams | Cubic Centimeter | Weight Percent | Volume Percent |
|---|---|---|---|---|
| Silica | 1.0000 | 0.4762 | 47.60 | 27.61 |
| Water | 0.1161 | 0.1161 | 5.53 | 6.73 |
| 85 Vis. Neut | 0.7035 | 0.8326 | 33.49 | 48.27 |
| Glycerol Monooleate | 0.1408 | 0.1500 | 6.70 | 8.69 |
| Amine 220 [1] (.936 g./cc.) | 0.1404 | 0.1500 | 6.68 | 8.70 |
| Totals | 2.1008 | 1.7249 | 100.00 | 100.00 |

[1] Proprietary product—90 per cent 1-hydroxyethyl 2-heptadecyl imidazoline.

One hundred grams of this fluid was made by blending 33.49 grams of oil with 6.70 grams of oleate and 6.68 grams of Amine 220 in a 400-cubic centimeter beaker, with a spatula. To this blend, 53.13 grams of the silanol silica was added along with 40 grams of n-hexane. The resultant slurry was passed through a three-roll paint mill three times to remove all traces of n-hexane. The electrofluid product was a thixotropic grease having initial D.C. forces of 145 oz./in.$^2$ and initial A.C. forces of 137 oz./in.$^2$ under the standard test conditions. After aging for 30 days at room temperature, the D.C. forces had decreased to about 60 oz./in.$^2$ and the A.C. forces to about 90 oz./in.$^2$.

The electrofluid formulations given above are merely representative of the many formulations which will produce superior electrofluids. The essential ingredients are silanol silica with 0 to 4 molecules of free water per square millimicron and a weakly adsorbed fluid vehicle. With this combination only, stable electrofluid greases with A.C. forces up to 40–50 oz./in.$^2$ (under A.C. test conditions) can be obtained. Higher A.C. stable forces with more fluid characteristics can be obtained by the addition of neutral fluidizers in the proper proportions. Still higher, but less stable forces can be attained by substitution of a portion of the neutral fluidizer with a basic fluidizer. Numerous other materials can be added to the above basic formulas for specific purposes to improve certain characteristics without impairing the excellence of the formulations.

In the following claims, the word "fluid" should be considered to include compositions which are either normally fluid at ambient temperatures, or which are thixotropic, that is, will become fluid upon being subjected to shear.

The embodiments of this invention in which an exclusive property or privilege is claimed are defined as follows.

We claim:

1. The method of increasing the silanol content of particulate silica containing less than about 8 molecules of water per square millimicron of surface area without incorporating excessive amounts of free water therein consisting in contacting said particulate silica with a gaseous atmosphere containing water vapor at a partial pressure greater than the partial pressure of water present on the silica until the total water content of the silica is increased to at least about 8 but not in excess of about 12 molecules per square millimicron of surface area, said contact occurring at a temperature within the range of about ambient temperatures to less than 200° C., and then aging the silica at a temperature in the range of ambient temperatures to less than 200° C. while maintaining the water content of the silica within the aforesaid limits for a period of time sufficient to complete the siloxane-water reaction to silanol silica.

2. The method in accordance with claim 1 in which the silica is aged in a substantially closed vessel.

3. The method in accordance with claim 2 in which the silica is aged at ambient temperatures.

4. The method in accordance with claim 3 in which the total water content of the silica is increased to about 12 molecules per square millimicron of silica surface area, and the silica is aged for about six days.

5. The method in accordance with claim 3 in which the water content of the silica is increased to about 8 molecules per square millimicron of silica surface area, and the silica is aged for about six to twelve days.

6. The method of removing free water from high-silanol-content silica without reducing the silanol content thereof consisting in heating the silica to a temperature in the range of about 100° to 120° C. while maintaining the silica in contact with a gaseous atmosphere containing water vapor at a partial pressure greater than the partial pressure exerted by said silanol content but below the water-vapor pressure of the silica at the aforesaid temperature.

7. The method in accordance with claim 6 in which said atmosphere is air substantially saturated with water vapor.

8. The method in accordance with claim 7 in which the silica is heated in a closed vessel and the pressure within the vessel is maintained at about ambient pressure.

9. The method in accordance with claim 8 in which said silica has 8 silanol groups per square millimicron of surface area and is maintained at said temperature for a period not in excess of about 68 hours.

10. The method of producing a high-silanol-content, low-free-water-content silica consisting in contacting particulate silica of less than maximum silanol content with a gaseous atmosphere containing water vapor at a partial pressure greater than the partial pressure of the silanol groups present on the silica until the total water content of the silica is increased to at least about 8 but not more than about 12 molecules per square millimicron of silica surface area, said contact occuring at a temperature in the range of about ambient temperatures to less than 200° C., then aging the silica for a period of time sufficient to complete the siloxane-water reaction to silanol silica at a temperature in the range of about ambient temperature to less than 200° C. while maintaining the water content of the silica at not less than said 8 molecules per square millimicron of surface area, and then effecting dehydration by heating the silica to a temperature in the range of about 100° to 120° C. while maintaining the silica in contact with an atmosphere containing water vapor at a partial pressure greater than the partial pressure exerted by said silanol content but less than the water-vapor pressure of the silica at the temperature to which it is heated.

11. The method in accordance with claim 10 in which the silica is aged at ambient temperatures in a closed vessel.

12. The method in accordance with claim 11 in which the dehydration is carried out under an atmosphere which is substantially saturated with water vapor.

13. The method in accordance with claim 12 in which the dehydration is carried out by heating the silica in a closed vessel and the pressure within the vessel is maintained at about ambient pressure by withdrawing therefrom water vapor evolved from the silica.

14. The method of increasing the silanol content of particulate silica containing less than the maximum number of silanol groups capable of being linked to the surface of the silica particles, consisting of contacting said particulate silica with a gaseous atmosphere containing water vapor at a partial pressure greater than the water partial pressure present on the silica until the total water content of the silica is increased to an amount in excess of that required for the desired silanol content but not substantially in excess of about 12 molecules of water per square millimicron of silica surface area, said contact occurring at a temperature of about ambient temperature to less than 200° C., then aging the silica at a temperature in the range of ambient temperature to less than 200° C., while maintaining the water content of the silica at least equivalent to that required to achieve the desired silanol content, for a period of time sufficient to complete the siloxane-water reaction to silanol silica.

15. The method in accordance with claim 14 in which the water content of the silica is increased to an amount not in excess of the amount required for the desired number of silanol groups plus one molecule of water per each silanol group.

16. The method accordance with claim 15 in which the desired silanol content is the maximum number of silanol groups that can form on the silica surface.

References Cited by the Examiner
UNITED STATES PATENTS

| | | | |
|---|---|---|---|
| 2,358,202 | 9/1944 | Behrman | 23—182 |
| 2,746,935 | 5/1956 | Weisz | 252—317 XR |
| 2,961,408 | 11/1960 | Havely et al. | 252—75 |
| 3,010,791 | 11/1961 | Allen | 23—182 |
| 3,047,507 | 7/1962 | Winslow | 252—75 |

OTHER REFERENCES

Vleeskens: "De Rol Van OH-Groepen in Silica," Uitgeverij Excelsior, Oranjeplein 96, 'S-Gravenhage, Nov. 9, 1959, pages 119–121.

JULIUS GREENWALD, *Primary Examiner.*